(12) United States Patent
Chiesl

(10) Patent No.: US 6,641,635 B1
(45) Date of Patent: Nov. 4, 2003

(54) LIQUID BASED AIR FILTRATION SYSTEM

(75) Inventor: Newell E. Chiesl, Colorado Springs, CO (US)

(73) Assignee: LSI Logic Corporation, Milpitas, CA (US)

( * ) Notice: Subject to any disclaimer, the term of this patent is extended or adjusted under 35 U.S.C. 154(b) by 115 days.

(21) Appl. No.: 09/957,555

(22) Filed: Sep. 19, 2001

(51) Int. Cl.[7] .......................... B01D 50/00; B01D 47/00
(52) U.S. Cl. .......................... 55/385.2; 95/149; 95/189; 96/234; 96/243; 454/187
(58) Field of Search .................. 55/385.2; 454/187; 95/149, 189, 195, 196, 197, 205, 228, 229; 96/234, 236, 237, 238, 240, 242, 243

(56) References Cited

U.S. PATENT DOCUMENTS

| | | | |
|---|---|---|---|
| 2,019,291 A | * 10/1935 | Brace et al. | |
| 3,353,335 A | * 11/1967 | Cabellero | |
| 3,964,886 A | * 6/1976 | Engalitcheff, Jr. et al. | |
| 3,980,080 A | 9/1976 | Muto | 128/146.6 |
| 4,135,894 A | 1/1979 | Himes et al. | 55/91 |
| 4,251,241 A | 2/1981 | Bothun | 55/238 |
| 4,578,253 A | * 3/1986 | Gill et al. | |
| 5,344,615 A | * 9/1994 | Yanagi et al. | |
| 5,409,834 A | 4/1995 | Birdwell | 435/310 |
| 5,669,946 A | 9/1997 | Blair, Jr. | 55/234 |
| 5,756,047 A | * 5/1998 | West et al. | |
| 5,944,894 A | * 8/1999 | Kitano et al. | |
| 6,333,003 B1 | * 12/2001 | Katano et al. | |
| 6,336,958 B2 | * 1/2002 | Lotens et al. | |
| 6,425,942 B1 | * 7/2002 | Forster | |

* cited by examiner

Primary Examiner—Duane S. Smith
(74) Attorney, Agent, or Firm—Carstens, Yee & Cahoon LLP

(57) ABSTRACT

An air filtration system uses a liquid to remove impurities from the air. A specialized chamber allows the air and liquid to contact each other in close proximity, so that the liquid can pick up not only particulate matter, but fumes and toxic gasses as well. The air can be bubbled through the liquid, or the liquid can be introduced into the chamber as a gentle rain, a spray, a vapor, a waterfall, or any other configuration that allows active contact between the two mediums. The liquid can then be cleaned of contaminants, e.g., by centrifugal force, while the liquid is then reused.

4 Claims, 5 Drawing Sheets

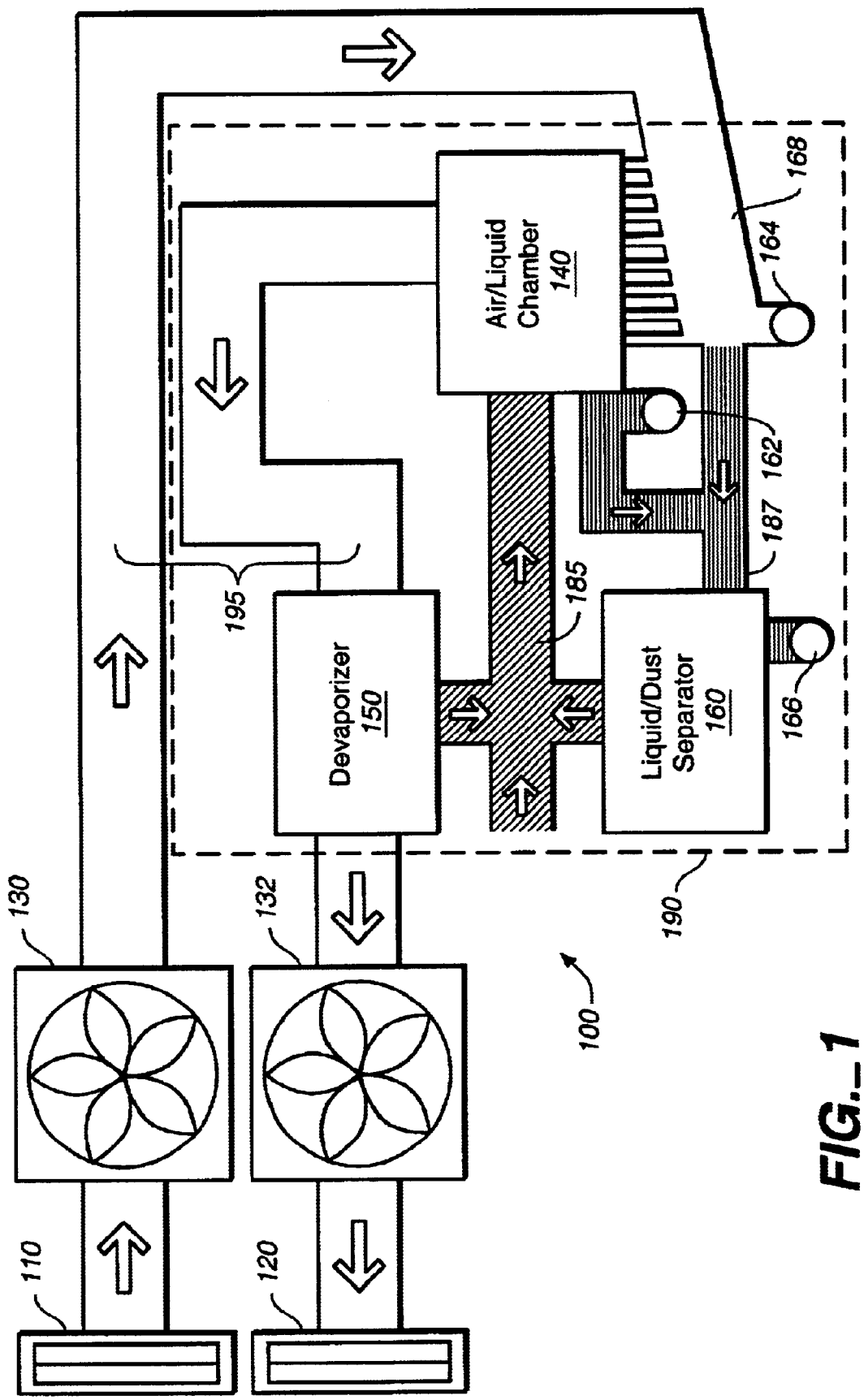
FIG._1

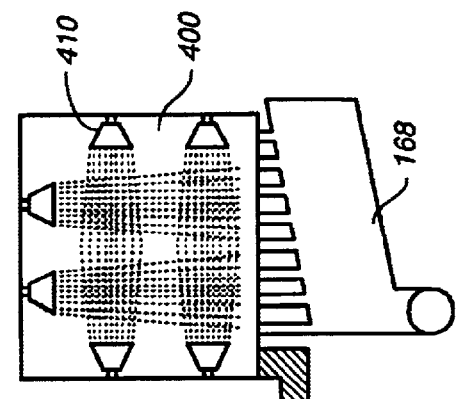
FIG._4
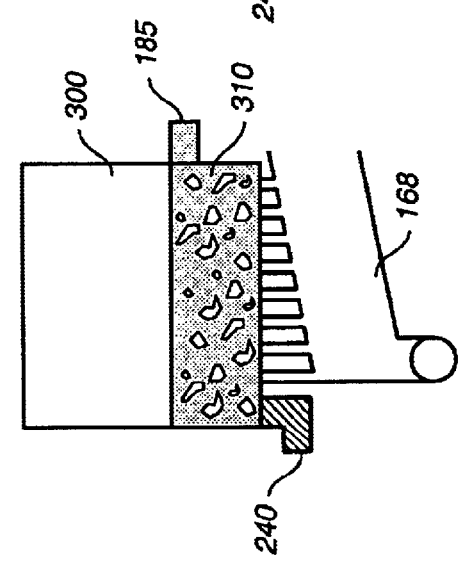
FIG._3
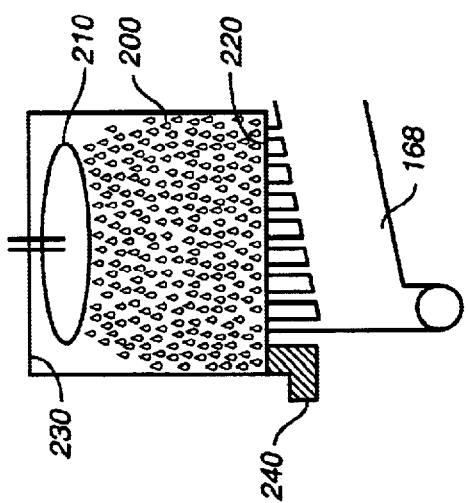
FIG._2
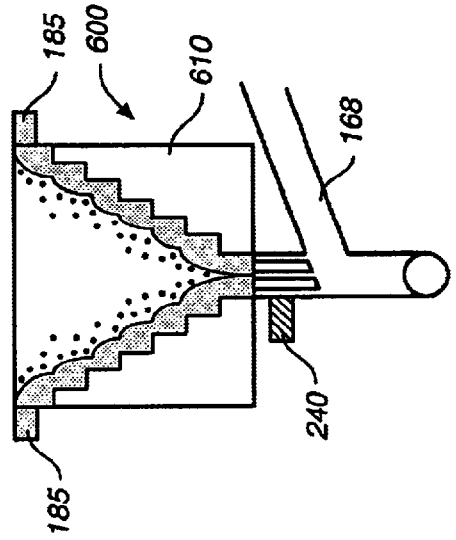
FIG._6
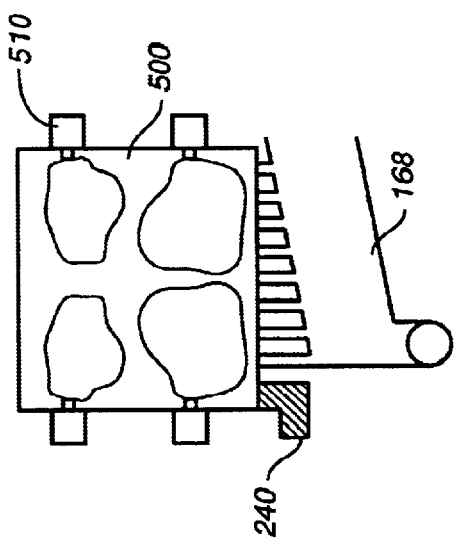
FIG._5

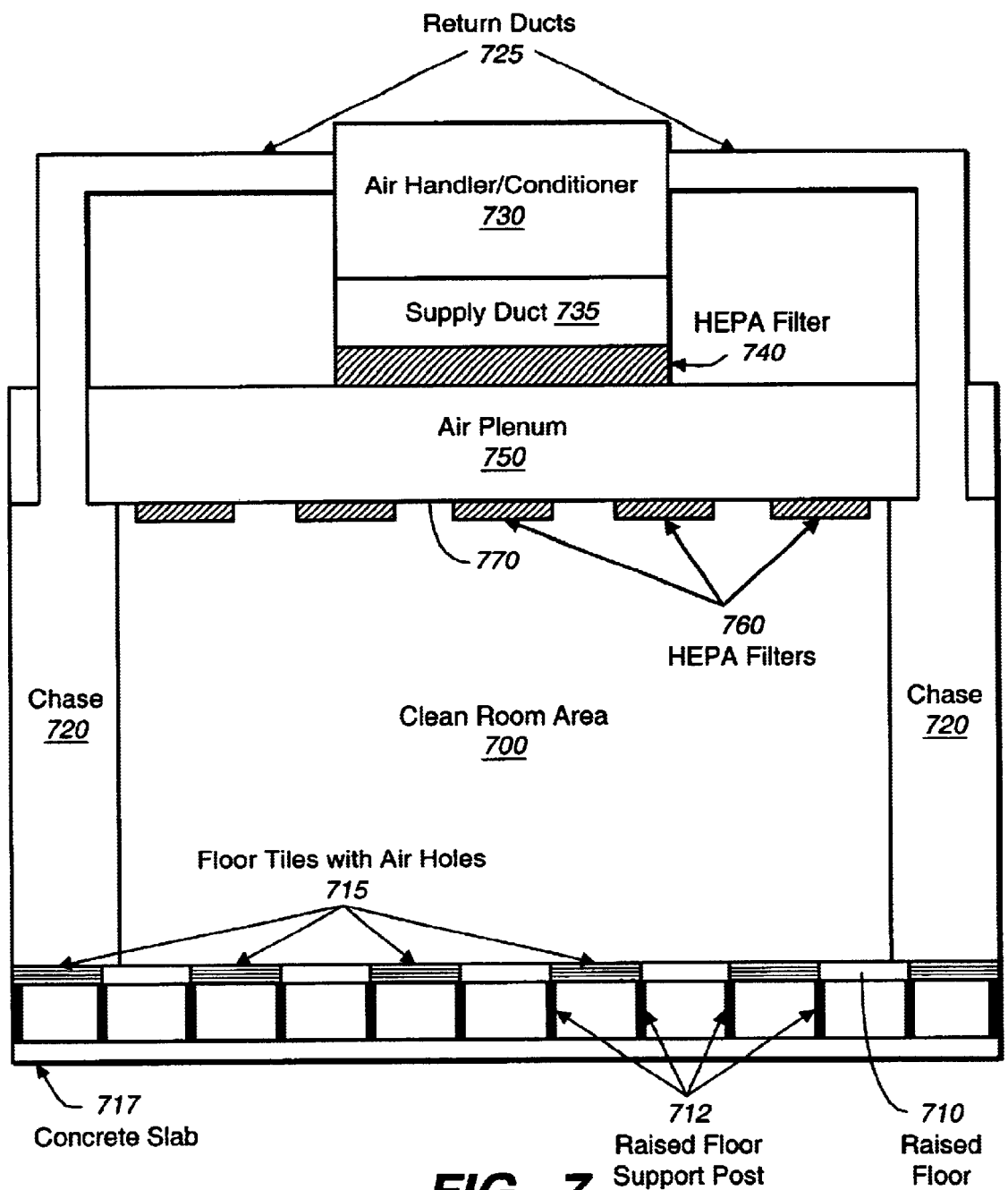
FIG._7
*(PRIOR ART)*

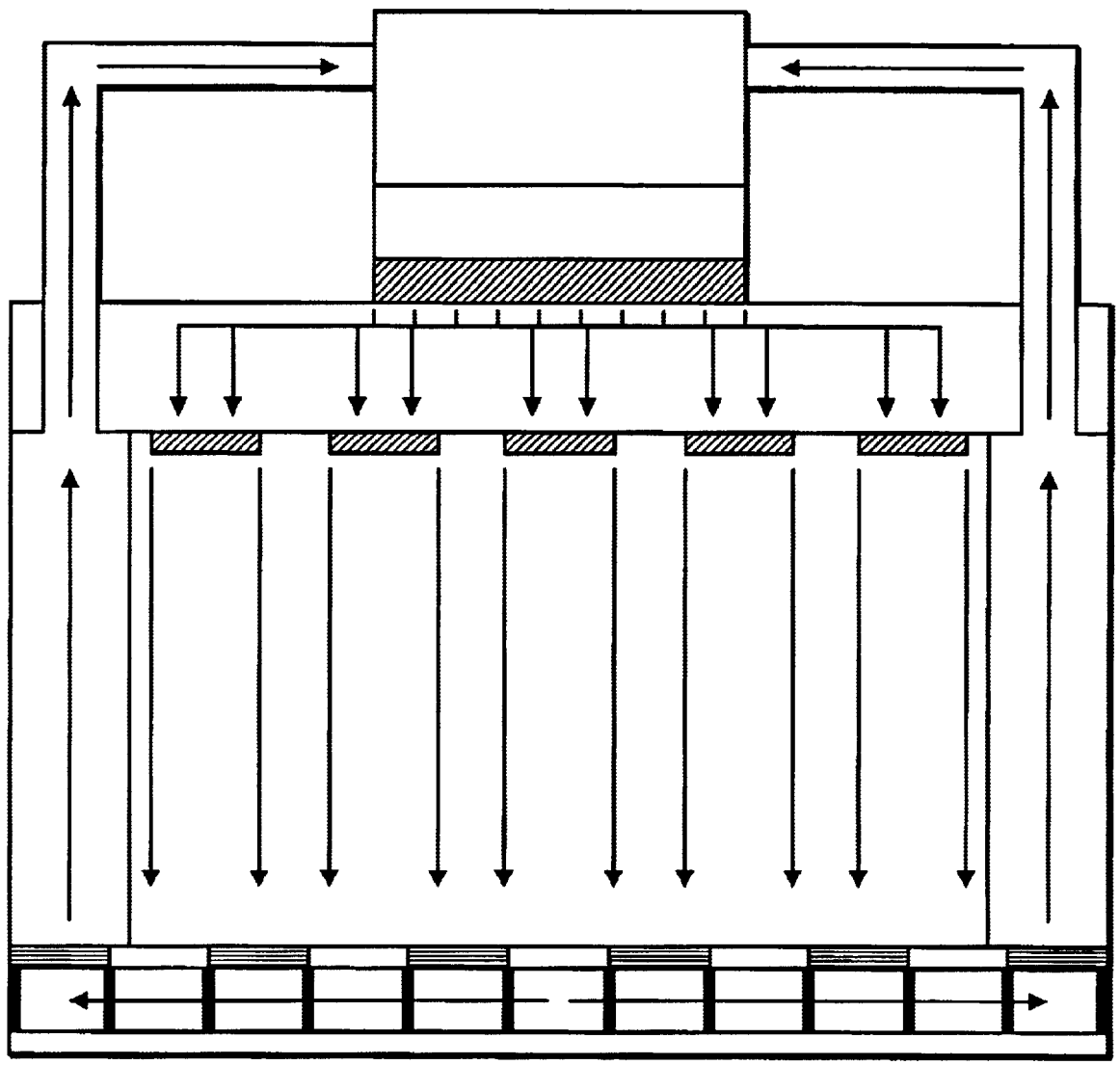
FIG._8
*(PRIOR ART)*

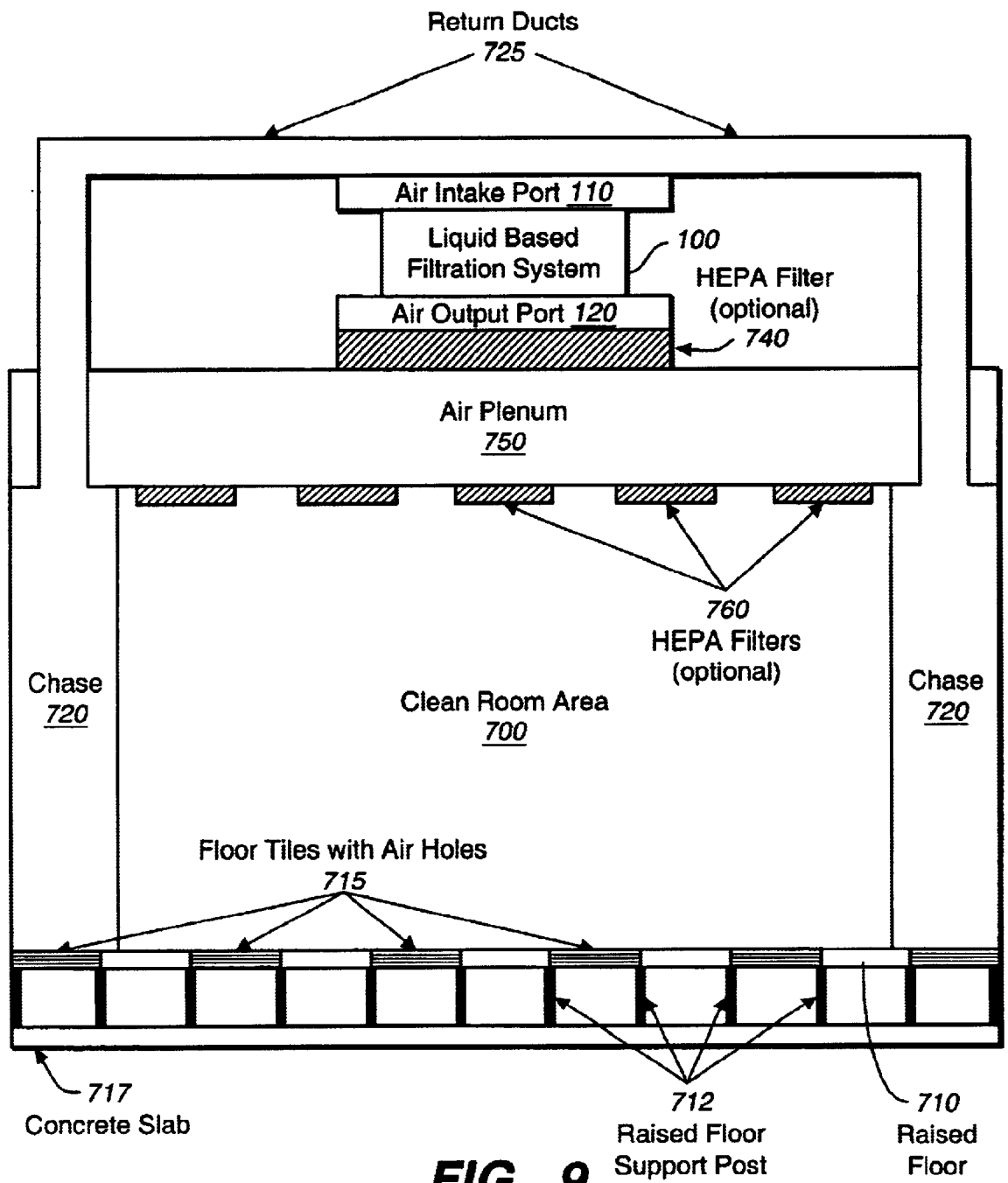
FIG._9
(PRIOR ART)

LIQUID BASED AIR FILTRATION SYSTEM

BACKGROUND OF THE INVENTION

1. Technical Field

The present invention relates to air filtration for semiconductor manufacturing facilities, general business, or residential use, and more specifically, to the use of a liquid to remove impurities from circulated air in these situations.

2. Description of the Related Art

Currently, air filtration for both commercial and residential applications is accomplished by passing the air through a mesh material that traps a large percentage of the particulate matter in the air. Depending on the particular mesh used, the effectiveness of the filtration can vary. The current state of the art in air filtration is High Efficiency Particulate Arresting (HEPA) filtration. HEPA filtration was developed during World War II by the Atomic Energy Commission as a means to protect their researchers from radioactive particles in the air. HEPA filters will remove particulate matter down to the range of 0.3 micron at an efficiency of 99.97%. HEPA filters have become widely known and used in recent years in settings as diverse as clean rooms for the manufacture of semiconductor chips, hospital operating rooms, and home air cleaners for allergy and asthma sufferers.

However, as the filter becomes clogged with the captured materials, the flow of air through the filter becomes more restricted, while the fans used to circulate the air have to work harder. Periodically, either the filter must be replaced with a new filter or it must be removed, cleaned, and reinstalled. Many filters, such as HEPA filters, cannot be cleaned and reused. Throw away filters contribute to the ever-growing waste disposal problem, but cleaning and reusing the filters tends to degrade the filters over time to a point of ruin.

Air filtration systems utilizing a liquid to aid in removal of particulate matter or toxic gases have been introduced for use in specific activities that generate high levels of polluted air. One example is U.S. Pat. No. 5,408,834, which scrubs air from such sources as a spray-painting booth, resulting in an air stream that is heavily polluted with volatile organic compounds. This patent directs the air into a series of chambers where the air contacts a liquid containing active microbes that will convert the organic compounds into non-toxic substances. One chamber sprays the incoming air with a spray to cool the air to a proper temperature for the microbes to work. Then, in order to increase the contact between the polluted air and the microbial laden liquid, one chamber sprays the liquid over a filter medium, through which the air must pass.

A somewhat similar problem is faced in the use of vacuum cleaners, where it is desirable to clean a stream of very dirty air before it leaves the vacuum cleaner. One current solution is to pass the air stream through a container of water, where turbulence mixes the air and water, so that the collected dirt is transferred from the air to the water, where it may be disposed of.

It would be desirable to have an air filtration system that did not create waste, yet remained efficient. It would further be desirable if such an air filtration system was suitable for use in clean-rooms, such as for the manufacture of semiconductors, as well as in residential and other commercial uses.

SUMMARY OF THE INVENTION

The invention includes a device and a method for air filtration, using a liquid, rather than a mesh, to remove particulate matter from the air. The invention also provides for the removal of other contaminants, such as solvents, toxic gasses, or other fumes. All contaminants would be trapped in the liquid, from which they can be removed by current methods, such as centrifugal force, allowing the liquid to be reused. The specific embodiment of the filtration system can use water or another liquid, or multiple different liquids to remove the contaminants. Bubblers, sprays, and vapors are a few of the ways in which the air/liquid interface can be structured.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 1 depicts an air filtration system in accordance with a preferred embodiment of the invention;

FIG. 2 depicts an air/liquid chamber configured as a rain chamber in accordance with a preferred embodiment of the invention;

FIG. 3 depicts an air/liquid chamber configured as a bubbling chamber in accordance with a preferred embodiment of the invention;

FIG. 4 depicts an air/liquid chamber configured as a spray chamber in accordance with a preferred embodiment of the invention;

FIG. 5 depicts an air/liquid chamber configured as a vapor chamber in accordance with a preferred embodiment of the invention;

FIG. 6 depicts an air/liquid chamber configured as a waterfall chamber in accordance with a preferred embodiment of the invention;

FIG. 7 demonstrates a high-level diagram of a current typical air handling system for a clean room;

FIG. 8 shows the structure of FIG. 7, but with the air flow shown; and

FIG. 9 demonstrates a clean room air handling system in accordance with a preferred embodiment of the invention.

DETAILED DESCRIPTION

With reference now to the figures and in particular with reference to FIG. 1, one embodiment of filtration system 100 for air filtration is disclosed. Air enters the system at intake port 110 and exits at output port 120, and between these two points is carried through ducting 195. Air-handling units 130 and 132 move the air through the filtration system 100. In air-handling units 130 and 132, fans or other devices serve respectively to draw air into air filtration system 100 or force air out of air filtration system 100, but though both types are shown, many applications will not require both input and output units. These items are conventional and do not require further explanation.

Incoming, dirty air is ducted into air/liquid chamber 140. This chamber is the location in which the actual filtration takes place, and specific embodiments will be discussed below. Once filtered, the clean air proceeds, if necessary, through a de-vaporizer 150, then exits the system. De-vaporizer 150 removes any vapor formed in air/liquid chamber 140. A de-vaporizer is not necessary if the liquid used is water or another liquid with low vapor pressure.

The liquid used in air/liquid chamber 140 has its own separate circulation system, allowing the liquid to be cleaned and returned to use. Contaminated liquid from air/liquid chamber 140 is carried through pipes 187 to a liquid/dust separator 160. There, the dust and other contaminates are removed from the liquid, which can then be re-circulated back to air/liquid chamber 140 through pipes 185. Liquid that is captured in de-vaporizer 150 also flows with the other clean liquid into air/liquid chamber 140. One embodiment for liquid/dust separator 160 utilizes centrifugal force to cause the liquid and particulate matter to separate. Alternate methods include boiling followed by condensation of the clean liquid, evaporation, settling tanks, mesh filters, skimming, and sand filters. Once separated, the particulate matter is then removed by appropriate means, while the liquid returns to circulation. One advantage of this system is that only the matter that is filtered out must be disposed of; with a liquid/dust separator, the liquid can be reused over and over without replacement. Alternatively, the liquid can be simply drained from filtration system 100, either periodically or continuously, with the separation taking place elsewhere. When water is the liquid, installations can choose to use pre-existing waste water systems to handle this task.

Water is one obvious choice for the liquid used, as it is non-toxic, plentiful, and inexpensive. However, many other liquids can also be used to remove specific fumes or chemicals. Solubility tables for the specific chemical can aid in determining the optimum liquid for a given situation.

In some cases, it may be desirable to use several successive chambers to achieve the desired filtration, either multiple chambers of the same liquid or a series of chambers having different liquids. When a single liquid is used in all chambers, it may be desirable to duplicate only air/liquid chamber 140, but multiple liquids would additionally require duplication of liquid handling portion 190 of the system.

In addition to the structures discussed above, accommodation is made for the removal of liquid from various points in the system. A lower liquid trap 168 keeps liquid from going into the air ducting from air/liquid chamber 140. This liquid trap can be directly connected to the liquid circulation system, as shown, but this is not necessary. In either case, when filtration system 100 is in operation, air pressure will keep most, but not all, of the liquid out of this region. When the air circulation is stopped, lower liquid trap 168 can fill with liquid. Lower liquid trap petcock 164 allows removal of liquid in the trap. Petcock 162, adjacent air/liquid chamber 140, provides for drainage of this chamber for maintenance, as petcock 166 does from liquid/dust separator 160.

We now turn to specific embodiments of air/liquid chamber 140. With reference to FIG. 2, a first embodiment of air/liquid chamber 140 in FIG. 1 is rain chamber 200. Air would preferably enter the chamber on the bottom 220 of the chamber, exiting from the top 230, or another configuration that would have it traverse a large portion of the chamber. The liquid enters the chamber at the top or sides of the chamber through one or more low-pressure heads 210, which cover as much of the chamber as possible. Low-pressure heads 210 can be fixed or can rotate and can have holes of a single pre-determined size or of many sizes. Droplets of liquid would capture dust particles and other contaminants as they fall, then carry them out through drain 240 near the bottom of rain chamber 200.

With reference to FIG. 3, bubbling chamber 300 represents an alternate embodiment of air/liquid chamber 140 of FIG. 1. In this embodiment, the air is bubbled through a pool 310 of liquid. As the air moves upward through the liquid, contaminates are removed by contact with the water. If a very low level of contaminants is collected in bubbling chamber 300, e.g., in residential use, it may be desirable to drain chamber 300 periodically through drain 240 and replace the liquid through piping 185, eliminating the need for liquid/dust separator 160 of FIG. 1. However, in moderate or high levels of dust or other contaminants, drain 240 would continuously remove liquid and contaminants while pipe 185 brings in fresh liquid.

With reference to FIG. 4, spray chamber 400 represents a further alternate embodiment of air/liquid chamber 140 of FIG. 1. In this embodiment, spray nozzles 410 inject the liquid under pressure into spray chamber 400, where the spray traverses as much of spray chamber 400 as possible. The locations and number of nozzles 410 can vary, as can their spray patterns, which can be, for example, conical, stream, or flat ribbon in shape. Nozzles 410 can sweep across spray chamber 400 or remain stationary; the spray can be continuous or pulsed. Like rain chamber 200 in FIG. 2, the flow of liquid traps and carries the contaminants out through drain 240 near the bottom of spray chamber 400.

With reference to FIG. 5, vapor chamber 500 represents a further alternate embodiment of air/liquid chamber 140 in FIG. 1. Vapor chamber 500 uses a vapor to remove dust and other contaminants. Vapor generators 510 introduce vapor into the chamber at various points. Vapor generators 510 can use techniques like boiling or ultrasound to create the vapor. Any vapor that condenses will be removed from vapor chamber 500 via drain 240, while any that is carried out with the airflow can be removed in de-vaporizer 150 in FIG. 1. While this embodiment, more than others, is likely to require a de-vaporization chamber, care in designing vapor chamber 500 to allow for condensation can minimize this need. Alternatively, it may be desirable to add moisture to the air, in which case, the de-vaporizer may be unnecessary.

With reference to FIG. 6, waterfall chamber 600 represents a further alternate embodiment of air/liquid chamber 140 of FIG. 1. Waterfall chamber 600 sends the liquid over a waterfall structure 610, which in this embodiment resembles a staircase descending from both side walls toward the center of the chamber. Not only the stream of liquid, but also the vapor, mist and spray created by the waterfall, will serve to catch particulate matter, which is then carried out through drain 240, which in this embodiment is partially seen behind the orifices through which the air travels from lower liquid trap 168 into chamber 660.

FIG. 7 demonstrates a high-level diagram of a current typical air handling system for a clean room. Clean room 700 typically has an underlying concrete slab 717. A raised floor 710 is built up over concrete slab 717, using raised floor support posts 712. Portions of raised floor 710 are built with floor tiles 715 which have numerous air holes through the tiles. Air is supplied to clean room 700 from ceiling 770 of the room, with the air directed toward raised floor 710, where it is removed from the room. Ideally, air that touches wafers, their carriers, or the equipment that makes them should come directly from the overhead, filtered source and not have had a chance to pick up any contaminates on the way. From the space between concrete slab 717 and raised floor 710, air from the clean room enters chase 720 carrying the air to an area above the clean room for handling and conditioning. Return ducts 725 direct the air from chase 720 to air handler/conditioner 730, where temperature, humidity, and other air handling are adjusted. Supply duct 735 is followed by HEPA filter 740, which removes particulate matter in the air, then the air moves into air plenum 750, which allows the air to travel across the surface of ceiling 770. Before the air is re-sent to clean room 700, it once again passes through HEPA filters 760 set in ceiling 770 of clean room 700. Note that numerous HEPA filters are used, both between air handler/conditioner 730 and air plenum 750 and between air plenum 750 and clean room 700. For a typical fab making 3,000 wafers per week, clean room 700 would be about 55,000 square feet. HEPA filters 760 are typically installed in 50% of the ceiling area and cost $300 for a 2-foot by 4-foot filter. The filters 760 should be changed twice a year, giving a typical cost of $2,062,500 per year to replace. Some clean rooms that make 10,000 wafers per week have filters in 100% of the ceiling. These installations typically spend about $13 million for filters alone, although small fabs may cost as low as $500,000 per year. Additionally, these filters only remove dust and particulate matter from the air; they do not remove chemicals or fumes. Currently, semiconductor plants rely on individual exhausts for removing toxics from the air. If toxics are released, sensors are necessary to sound an alarm.

FIG. 8 is the same drawing as FIG. 7, but with the air flow shown. Air moves downward from air handler/conditioner 730, through plenum 750 and into clean room 700. Under floor 710, the air travels outward until it enters chase 720, to be carried upward to return ducts 725 and returned to air handler/conditioner 730.

FIG. 9 demonstrates a clean room air handling system in accordance with a preferred embodiment of the invention. The basic airflow of clean room 700 is unchanged, but air handler/conditioner 730 is replaced by the liquid based air filtration system 100 of FIG. 1. Air intake port 110 receives air from return ducts 725, sends it though liquid based air filtration system 100. Air leaving air output port 120 moves into air plenum 750. Note that HEPA filters 740 and 760 are shown in this drawing, but they are optional. If they are still used, they should last a lot longer, and cost significantly less, because the air moving into them should be much cleaner.

In a wafer fab using a clean room as shown, some of the chemicals used that can enter the air stream include boron trifloride, isopropyl alcohol, acetone, sulfuric acid, hydrochloric acid, hydrofluoric acid, various metal organics, nitric acid, ammonium. All of the above contaminants are soluble or miscible in water; thus water would be an ideal liquid for removing them from the air. Other contaminants can include, gaseous arsine and phosphine, and phosphorous oxycloride (POCl3). These contaminants are insoluble or only slightly soluble in water, so either another air/liquid chamber would be necessary, with an appropriate liquid, or other means used to remove them when present. Still other fab contaminants, such as silane and tetraethylorthosilicate (TEOS), can spontaneously ignite in air, so they will be removed from the clean room air through separate venting to the outside, so they will not affect the present system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A clean room area comprising:

first air ports that allow air to enter the clean room near a ceiling thereof;

second air ports that collect air as it leave said clean room; and air handling equipment that processes the air prior to returning the air to the clean room, wherein said air handling equipment is operatively connected to said first air ports and said second air ports, wherein said air handling equipment comprises:

an air/liquid chamber, wherein the air in said air/liquid chamber contacts a liquid, which removes contaminants in the air; and a liquid/dust separator system, connected to said air/liquid chamber, which collects said liquid, removes contaminants from said liquid, and returns said liquid to said air/liquid chamber.

2. The clean room area of claim 1, wherein said liquid is water.

3. The clean room of area of claim 1, wherein said air handling equipment further comprises cooling equipment.

4. The clean room of area of claim 1, further comprising HEPA filters, whereby said HEPA filters can be changed less frequently.

* * * * *